(12) United States Patent
Hanumalagutti et al.

(10) Patent No.: US 10,086,538 B2
(45) Date of Patent: Oct. 2, 2018

(54) THERMAL MANAGEMENT ASSEMBLY FOR AN ELECTRIFIED VEHICLE

(71) Applicant: Ford Global Technologies, LLC, Dearborn, MI (US)

(72) Inventors: Prasad Dev Hanumalagutti, Dearborn, MI (US); Michael W. Degner, Novi, MI (US); Edward Chan-Jiun Jih, Troy, MI (US); Guangyin Lei, Dearborn Heights, MI (US); Franco Leonardi, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 345 days.

(21) Appl. No.: 15/072,731

(22) Filed: Mar. 17, 2016

(65) Prior Publication Data

US 2017/0271940 A1 Sep. 21, 2017

(51) Int. Cl.
| | |
|---|---|
| B29C 41/42 | (2006.01) |
| B29C 41/14 | (2006.01) |
| B29C 41/20 | (2006.01) |
| B29C 41/40 | (2006.01) |
| H02K 3/24 | (2006.01) |
| B29K 63/00 | (2006.01) |
| B29L 31/34 | (2006.01) |

(Continued)

(52) U.S. Cl.
CPC ............. *B29C 41/42* (2013.01); *B29C 41/14* (2013.01); *B29C 41/20* (2013.01); *B29C 41/40* (2013.01); *H02K 3/24* (2013.01); *B29K 2063/00* (2013.01); *B29L 2031/3481* (2013.01); *B60K 6/26* (2013.01); *B60Y 2200/92* (2013.01); *B60Y 2306/05* (2013.01); *B60Y 2410/10* (2013.01); *H02K 9/197* (2013.01); *Y10S 903/906* (2013.01)

(58) Field of Classification Search
CPC ........................................................ H02K 9/19
See application file for complete search history.

(56) References Cited

U.S. PATENT DOCUMENTS

| 3,574,325 | A | * | 4/1971 | Agarwal | ................ | H02K 7/102 |
| | | | | | | 188/156 |
| 4,845,394 | A | * | 7/1989 | Kleinhans | ................ | H02K 9/18 |
| | | | | | | 165/903 |
| 5,845,389 | A | | 12/1998 | Roberts et al. | | |

(Continued)

FOREIGN PATENT DOCUMENTS

WO 2010058278 A2 5/2010

*Primary Examiner* — Robert W Horn
(74) *Attorney, Agent, or Firm* — David B. Kelley; Brooks Kushman P.C.

(57) ABSTRACT

A cover for a housing of an electric machine is provided. The cover may include an inner sidewall and an outer sidewall. The outer sidewall may be spaced apart from the inner sidewall to define a coolant channel therebetween. The inner sidewall and outer sidewall may be defined by an interior surface of the cover such that the coolant channel receives end windings of a stator of the electric machine when the cover is secured to the housing. The interior surface of the cover may define features between the sidewalls to promote turbulence of coolant flowing through the coolant channel. The interior surface of the cover may define a meandering trough between the sidewalls to form a predetermined coolant path relative to a location of the end windings when the cover is secured to the housing.

16 Claims, 10 Drawing Sheets

(51) Int. Cl.
*B60K 6/26* (2007.10)
*H02K 9/197* (2006.01)

(56) References Cited

U.S. PATENT DOCUMENTS

| | | | |
|---|---|---|---|
| 6,211,587 B1 | 4/2001 | Enomoto et al. | |
| 6,300,693 B1 | 10/2001 | Poag et al. | |
| 6,407,474 B1 | 6/2002 | Mahn et al. | |
| 6,452,294 B1 | 9/2002 | Vandervort et al. | |
| 6,515,384 B1 * | 2/2003 | Kikuchi | H02K 1/20 310/54 |
| 6,727,611 B2 | 4/2004 | Bostwick | |
| 6,787,950 B2 | 9/2004 | Heim | |
| 6,856,053 B2 * | 2/2005 | LeFlem | H02K 3/47 310/194 |
| 7,157,818 B2 | 1/2007 | Jones | |
| 7,160,086 B2 * | 1/2007 | Maceyka | H02K 9/06 310/63 |
| 7,538,457 B2 | 5/2009 | Holmes et al. | |
| 7,566,999 B2 | 7/2009 | Neal | |
| 7,591,147 B2 * | 9/2009 | Masoudipour | F25B 31/006 165/169 |
| 7,692,356 B2 | 4/2010 | Bott et al. | |
| 7,768,166 B2 | 8/2010 | Lafontaine et al. | |
| 7,888,828 B2 * | 2/2011 | Takahashi | H02K 5/18 310/54 |
| 7,928,348 B2 | 4/2011 | Neal | |
| 7,952,240 B2 * | 5/2011 | Takenaka | H02K 1/20 310/260 |
| 8,080,908 B2 | 12/2011 | Matsubara et al. | |
| 8,080,909 B2 | 12/2011 | Perkins | |
| 8,093,770 B1 * | 1/2012 | Berhan | H02K 9/19 310/52 |
| 8,138,640 B2 | 3/2012 | Urano et al. | |
| 8,198,762 B2 * | 6/2012 | Gagnon | H02K 9/19 310/54 |
| 8,405,262 B1 | 3/2013 | Beatty et al. | |
| 8,541,914 B2 | 9/2013 | Knight et al. | |
| 8,766,497 B2 | 7/2014 | Goto et al. | |
| 8,963,384 B2 | 2/2015 | Kirkley, Jr. et al. | |
| 8,970,073 B2 * | 3/2015 | Miyamoto | H02K 9/19 310/54 |
| 9,419,499 B2 * | 8/2016 | Matsui | H02K 9/19 |
| 9,438,082 B2 * | 9/2016 | Kurono | H02K 3/24 |
| 9,768,658 B2 * | 9/2017 | Bulatow | H02K 5/04 |
| 9,881,019 B2 * | 1/2018 | Matsuo | G06F 17/30174 |
| 9,897,190 B2 * | 2/2018 | Yu | F16H 55/36 |
| 9,935,534 B2 * | 4/2018 | Vollmer | H02K 21/40 |
| 10,008,907 B2 * | 6/2018 | Hanumalagutti | H02K 9/19 |
| 2002/0153784 A1 * | 10/2002 | Kanppenberger | H02K 3/24 310/52 |
| 2008/0035399 A1 * | 2/2008 | Murata | B60K 7/0007 180/65.51 |
| 2008/0042498 A1 | 2/2008 | Beer | |
| 2008/0042502 A1 | 2/2008 | VanLuik et al. | |
| 2008/0143203 A1 | 6/2008 | Purvines et al. | |
| 2010/0045125 A1 | 2/2010 | Takenaka et al. | |
| 2011/0215660 A1 | 9/2011 | Goto et al. | |
| 2011/0241460 A1 | 10/2011 | Mebarki et al. | |
| 2012/0032543 A1 | 2/2012 | Chakraborty et al. | |
| 2012/0062056 A1 | 3/2012 | Bradfield | |
| 2012/0091838 A1 | 4/2012 | Miyamoto et al. | |
| 2012/0242178 A1 * | 9/2012 | Miyamoto | H02K 3/24 310/54 |
| 2013/0342049 A1 | 12/2013 | Stridsberg | |
| 2014/0117796 A1 * | 5/2014 | Kassler | H02K 5/20 310/54 |
| 2014/0265663 A1 | 9/2014 | Chamberlin et al. | |
| 2014/0265670 A1 | 9/2014 | Chamberlin et al. | |
| 2014/0354090 A1 * | 12/2014 | Chamberlin | H02K 9/19 310/54 |
| 2015/0217632 A1 | 8/2015 | Lebeau et al. | |
| 2015/0280525 A1 | 10/2015 | Rippel et al. | |
| 2015/0280526 A1 | 10/2015 | Chamberlin et al. | |
| 2016/0006302 A1 * | 1/2016 | Gugel | H02K 1/20 310/54 |
| 2016/0308414 A1 * | 10/2016 | Takahashi | H02K 9/19 |
| 2017/0012504 A1 * | 1/2017 | Sever | H02K 5/18 |
| 2017/0025911 A1 * | 1/2017 | Jewell | H02K 3/24 |
| 2017/0267055 A1 * | 9/2017 | Hanumalagutti | B60H 1/0055 |
| 2017/0271940 A1 * | 9/2017 | Hanumalagutti | B29C 41/14 |
| 2017/0271954 A1 * | 9/2017 | Hanumalagutti | H02K 5/20 |
| 2017/0288506 A1 * | 10/2017 | Asagara | H02K 9/19 |
| 2018/0062456 A1 * | 3/2018 | Sung | B60L 11/1803 |

* cited by examiner

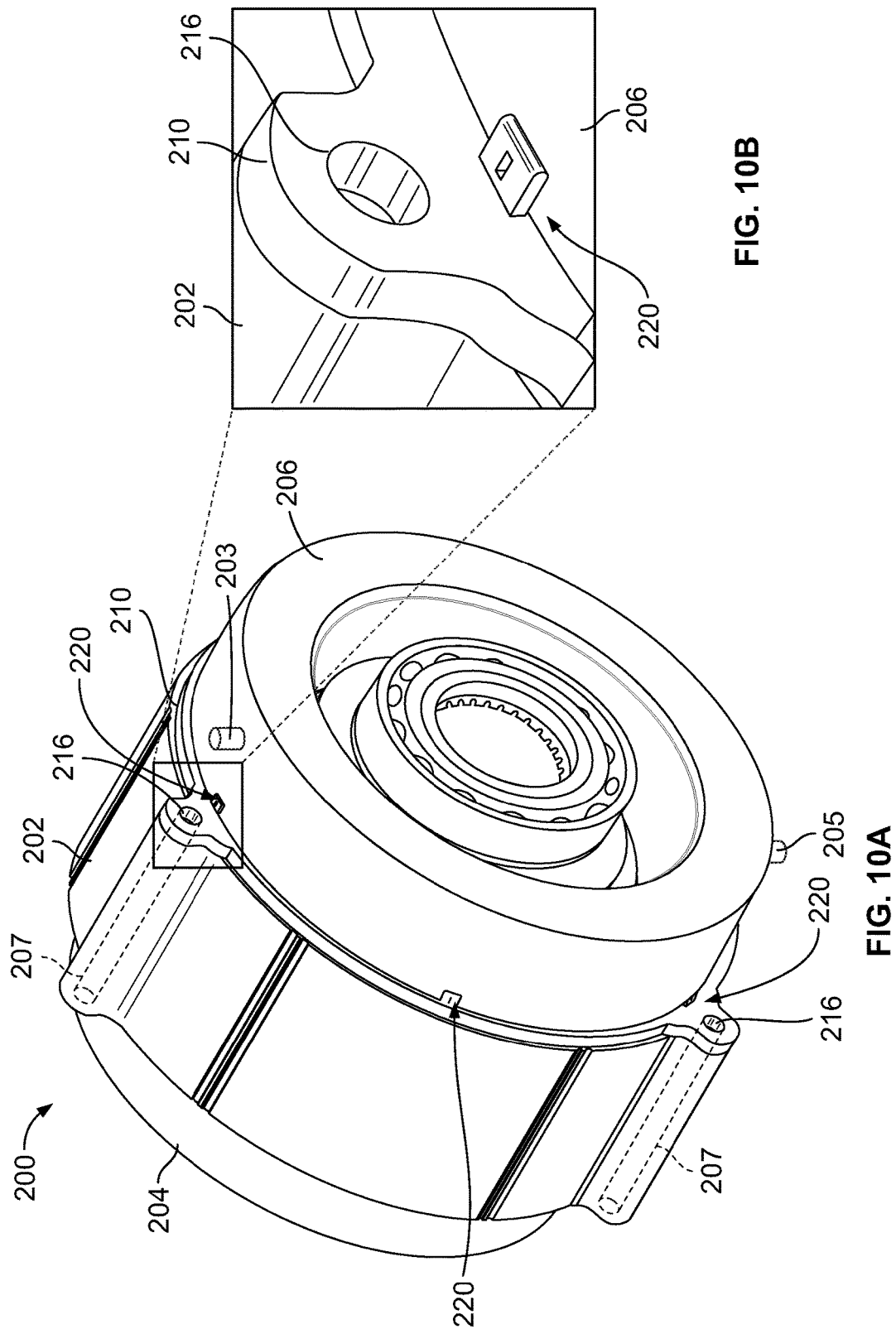

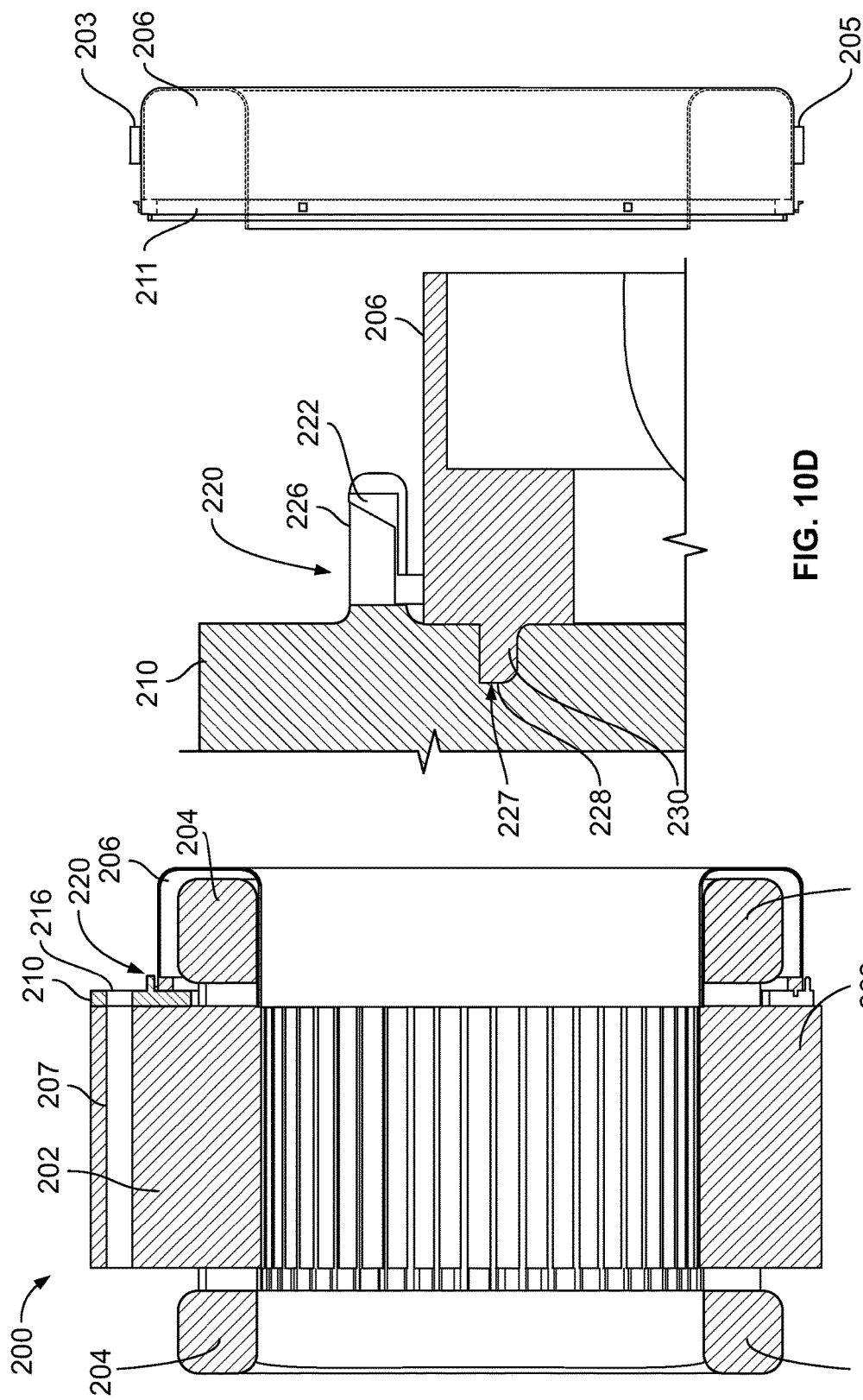

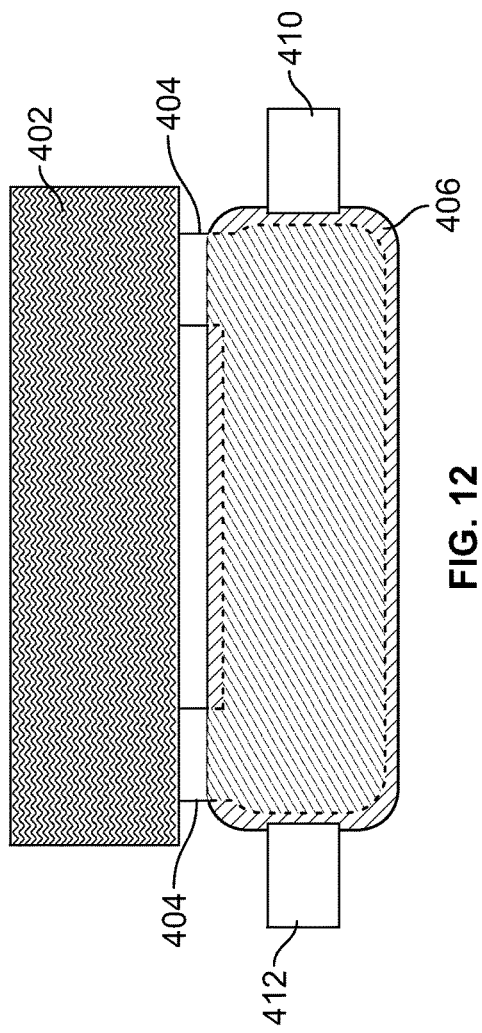
FIG. 12
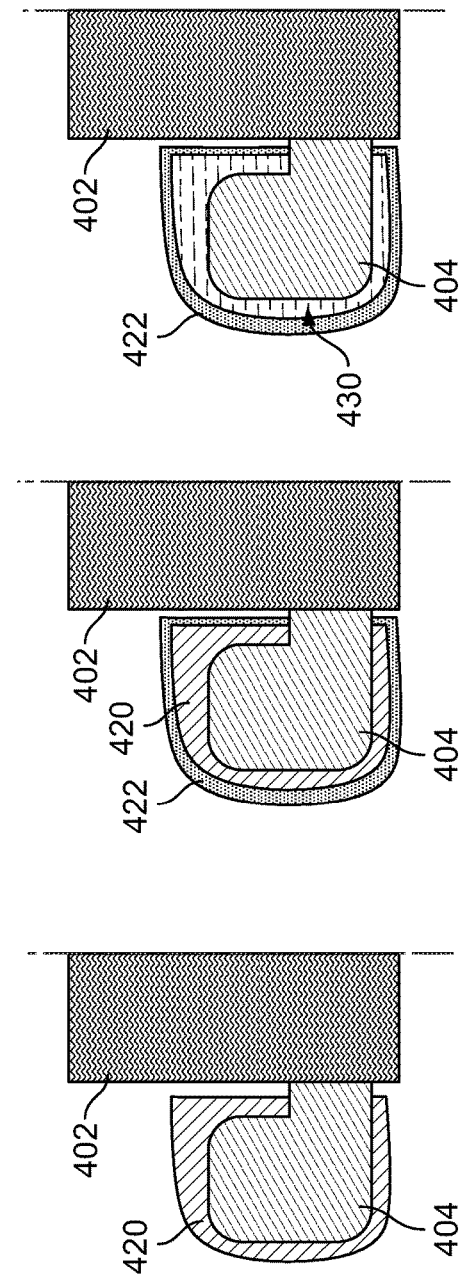
FIG. 13
FIG. 14
FIG. 15

THERMAL MANAGEMENT ASSEMBLY FOR AN ELECTRIFIED VEHICLE

TECHNICAL FIELD

The present disclosure relates to a thermal management assembly for an electric machine of an electrified vehicle.

BACKGROUND

Extended drive range technology for electrified vehicles, such as battery electric vehicles ("BEVs") and plug in hybrid vehicles ("PHEVs"), is continuously improving. Achieving these increased ranges, however, often requires traction batteries and electric machines to have higher power outputs and associated thermal management systems with increased capacities in comparison to previous BEVs and PHEVs.

SUMMARY

A cover for a housing of an electric machine includes an inner sidewall and an outer sidewall. The outer sidewall is spaced apart from the inner sidewall to define a coolant channel therebetween. The inner sidewall and outer sidewall are defined by an interior surface of the cover such that the coolant channel receives end windings of a stator of the electric machine when the cover is secured to the housing. The interior surface of the cover may define features between the sidewalls to promote turbulence of coolant flowing through the coolant channel. The features may be one of a plurality of individual extrusions scattered about the coolant channel, concentric circular extrusions about a hub of the coolant channel, or post extrusions spaced apart from one another along the inner sidewall or outer sidewall. The interior surface of the cover may define a meandering trough between the sidewalls to form a predetermined coolant path relative to a location of the end windings when the cover is secured to the housing. The cover may define an inlet and an outlet open to the coolant channel. The stator and the outer sidewall may be sized such that the coolant channel is sealed when the cover is secured to the housing. The cover may further define one or more fins on an exterior surface proximate the coolant channel to operate as a heat sink therefore.

A housing of an electrified vehicle electric machine includes a cover, an inner sidewall, and an outer sidewall. The cover defines an interior surface and an exterior surface. The inner sidewall is defined by the interior surface and has a circular shape. The outer sidewall is defined by the interior surface and spaced apart from the inner sidewall to define a coolant channel therebetween. The interior surface is arranged with the housing such that the coolant channel receives end windings of a stator of the electric machine when the cover is secured to the housing. The interior surface may further define a meandering trough between the inner sidewall and outer sidewall for coolant to flow therethrough. The outer sidewall may further define an inlet and an outlet open to the coolant channel. The outer sidewall may be spaced from an edge of the cover such that a rotor of the electric machine at least partially extends in between the inner sidewall. The inner sidewall may define a cavity sized for a rotor of the electric machine to at least partially extend therethrough. The interior surface may define features between the sidewalls to promote turbulence of coolant flowing through the coolant channel. A sealant may be disposed between the sidewalls and the stator. The stator may further define a bracket extending from a face of the stator sized to receive a key defined by the outer sidewall to secure the outer sidewall to the stator. The stator may define a slot sized to receive a tab defined by the outer sidewall to secure the outer sidewall to the stator. An O-ring plate may be sized for disposal between the sidewalls and the stator. One or more fins may extend from an exterior cover surface and may be located proximate the coolant channel. The one or more fins may be adjacent one of an inlet or outlet defined by the outer sidewall.

A method to form an encasement about end windings of an electric machine includes immersing the end windings in a mold material bath and then removing the end windings for the mold material to solidify and define a base mold upon the end windings; positioning inlet and outlet placeholders extending in and out of the base mold; immersing the base mold in an epoxy bath and then removing the base mold for the epoxy to solidify and define an over mold; and dissolving the base mold via a liquid applied to the base mold such that a cavity is defined between the end windings and the over mold.

BRIEF DESCRIPTION OF THE DRAWINGS

FIG. 10A is a perspective view of a portion of an electric machine.

FIG. 10B is a perspective view of a fastener assembly of the portion of the electric machine of FIG. 10A.

FIG. 10C is a side view, in cross-section, of the portion of the electric machine of FIG. 10A.

FIG. 10D is a side detail view, in cross-section, of the fastener assembly of FIG. 10B.

FIG. 10 E is a side view of an encasement of the portion of the electric machine of FIG. 10A.

FIG. 12 is a schematic diagram of an example of a portion of an electric machine.

FIG. 13 is a schematic diagram of an example of a step in a mold process.

FIG. 14 is a schematic diagram of an example of another step in a mold process.

FIG. 15 is a schematic diagram of an example of yet another step in a mold process.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1A:
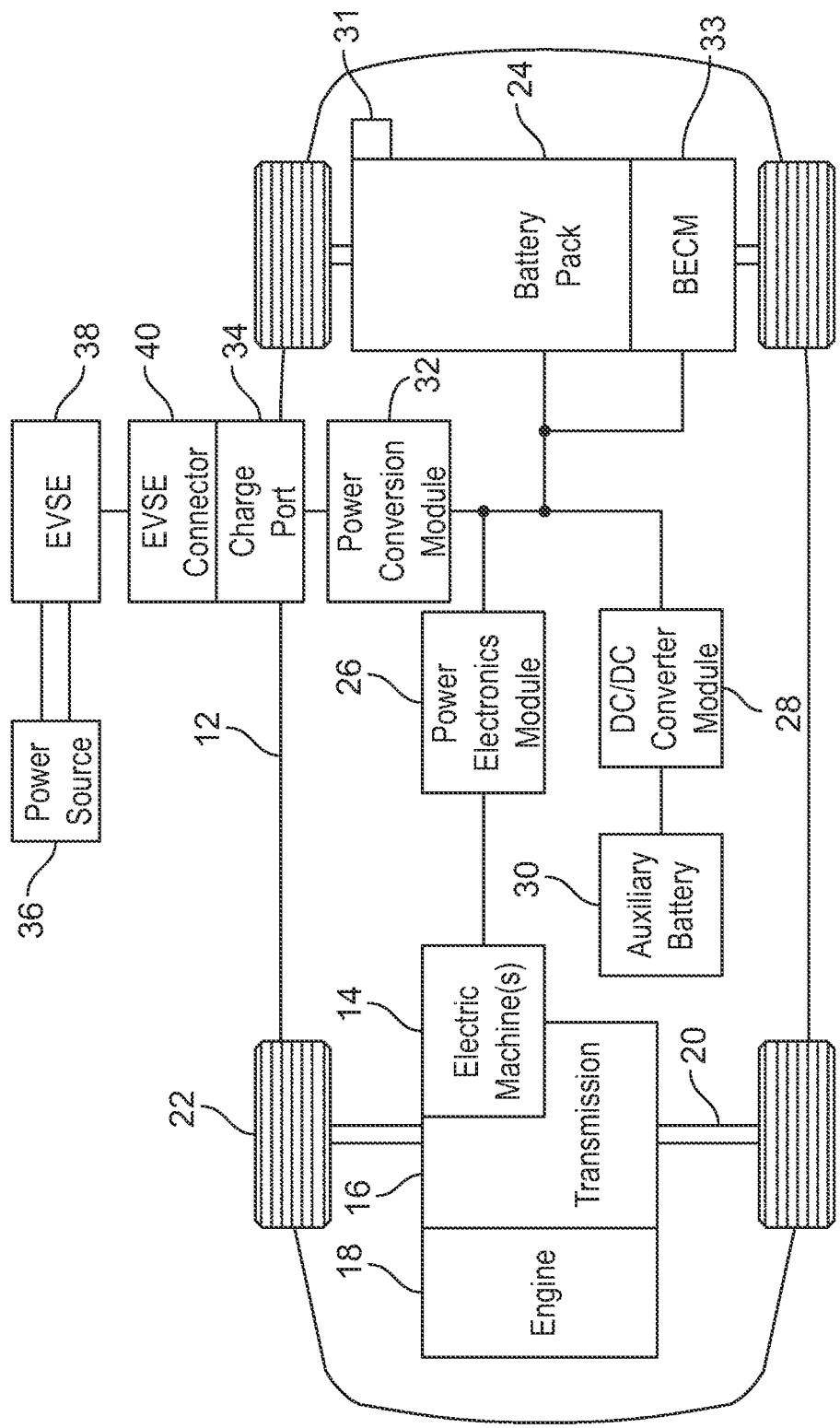
FIG. 1A is a schematic diagram illustrating an example of an electrified vehicle.

FIG. 1A depicts a schematic of an example of a PHEV, referred to as a vehicle 12 herein. The vehicle 12 may comprise one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to a set of wheels 22. The electric machines 14 can provide propulsion and deceleration capability when the engine 18 is turned on or off. The electric machines 14 may also act as generators and may provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that may be used by the electric machines 14. The traction battery 24 may provide a high voltage DC output from one or more battery cell arrays, sometimes referred to as battery cell stacks, within the traction battery 24. The battery cell arrays may include one or more battery cells. The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may also be electrically connected to the electric machines 14 and provides the ability to bi-directionally transfer electrical energy between the traction battery 24 and the electric machines 14. For example, the traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. Portions of the description herein are equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A DC/DC converter module 28 may convert high voltage DC output of the traction battery 24 to a low voltage DC supply that is compatible with other vehicle loads. Other high-voltage loads, such as compressors and electric heaters, may be connected directly to the high-voltage without the use of the DC/DC converter module 28. The low-voltage systems may be electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electrified vehicle which includes components for a PHEV, a FHEV, a MHEV, or a BEV. The traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

Current examples of thermal management assemblies for electric machines may introduce oil to portions of the electric machine for cooling purposes. The oil may be dripped or sprayed onto wire end windings of the electric machine. However, this practice may not be very effective in cooling the end windings due to a non-uniformity of coolant flow as applied to the end windings. An air cooled thermal management assembly is another example of an assembly to assist in managing thermal conditions of an electric machine. In this example, a fan or blower may be located adjacent the end windings to push air thereto for cooling purposes.

Figure 1B:
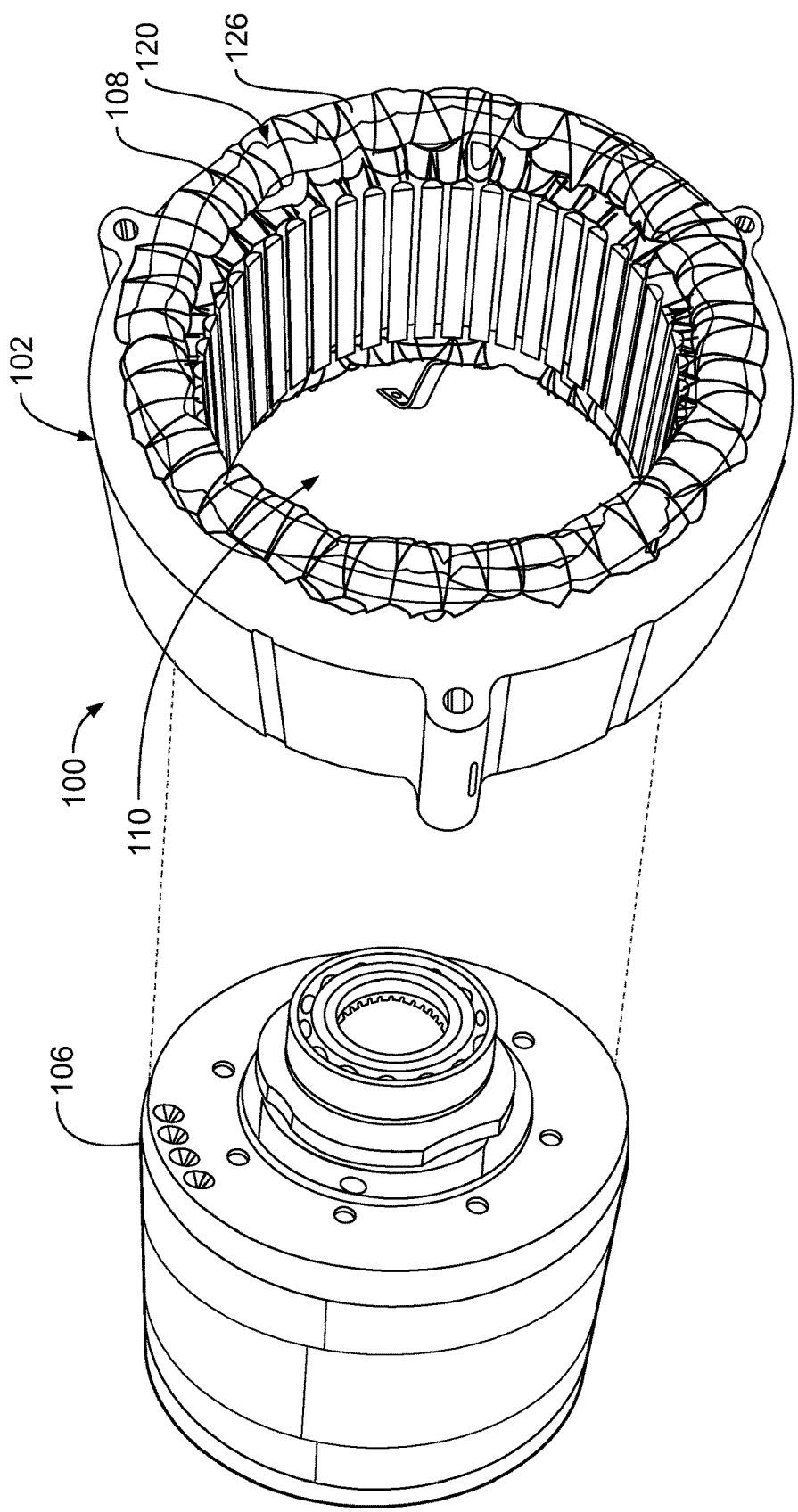
FIG. 1B is a perspective view of an example of an electric machine.

FIG. 1B shows an example of an electric machine for an electrified vehicle, referred to generally as an electric machine 100 herein. The electric machine may include a stator core 102 and a rotor 106. Electrified vehicles may include two electric machines. One of the electric machines may function primarily as a motor and the other may function primarily as a generator. The motor may operate to convert electricity to mechanical power and the generator may operate to convert mechanical power to electricity. The stator core 102 may define an inner surface 108 and a cavity 110. The rotor 106 may be sized for disposal and operation within the cavity 110. A shaft (not shown) may be operably connected to the rotor 106 to drive rotation thereof.

Windings 120 may be disposed within the cavity 110 of the stator core 102. In an electric machine motor example, current may be fed to the windings 120 to obtain a rotation force on the rotor 106. In an electric machine generator example, current generated in the windings 120 by a rotation of the rotor 106 may be removed to power vehicle components. Portions of the windings 120, referred to as end windings 126 herein, may protrude from the cavity 110. During operation of the electric machine 100, heat may be generated along the windings 120 and end windings 126.

Figure 2B:
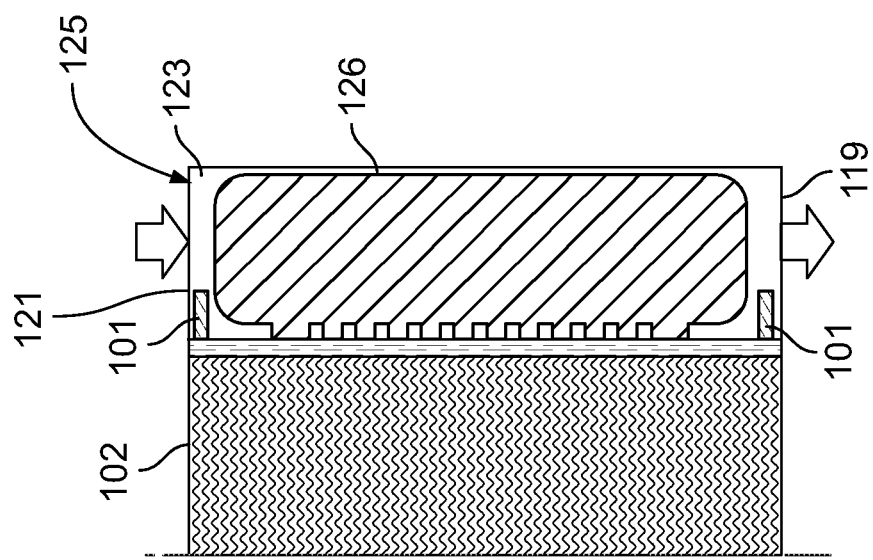
FIG. 2B is a side view, in cross-section, of a portion of an electric machine having an open coolant channel for end windings.
Figure 2A:
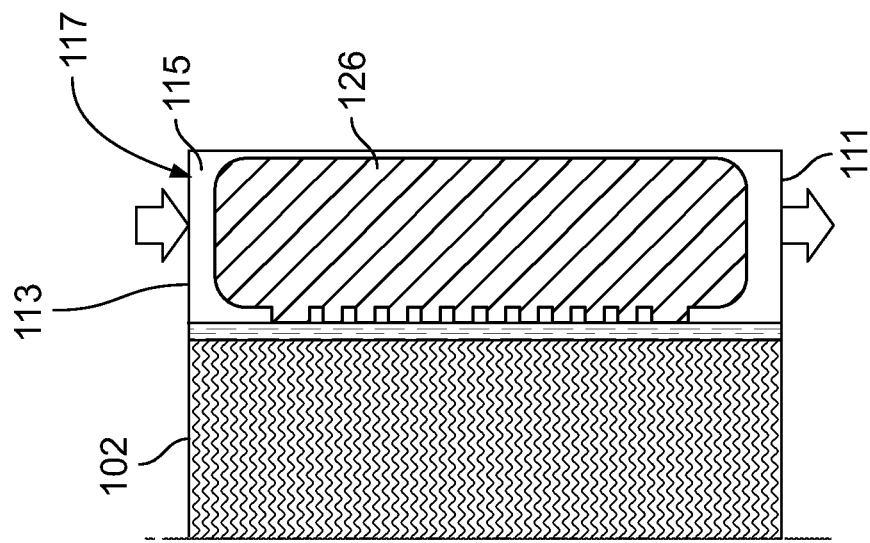
FIG. 2A is a side view, in cross-section, of a portion of an electric machine having a closed coolant channel for end windings.

FIGS. 2A and 2B show examples of portions of a closed coolant channel assembly and an open coolant channel assembly to assist in managing thermal conditions of end windings of an electric machine. For example, FIG. 2A shows a closed coolant channel assembly 125 mounted to the stator core 102 via a set of tabs 101 sized for insertion within apertures (not shown) of the closed coolant channel assembly 125. It is contemplated that other suitable features may be used to mount the closed coolant channel assembly 125 to the stator 102. The closed coolant channel assembly 125 may define a cavity 123 sized to receive end windings 126. An inlet 121 may deliver coolant to the cavity 123 to assist in managing thermal conditions of the end windings 126. Coolant may exit the cavity 123 via an outlet 119. As another example, FIG. 2B shows an open coolant channel assembly 117 which may be mounted to the stator 102. The open coolant channel assembly 117 may define a cavity 115 sized to receive end windings 126. An inlet 113 may deliver coolant to the cavity 115 to assist in managing thermal conditions of the end windings 126. Coolant may exit the cavity 115 via an outlet 111. Packaging constraints and desired performance of a coolant system may factor into a decision to use an open or closed coolant channel assembly.

Figure 3B:
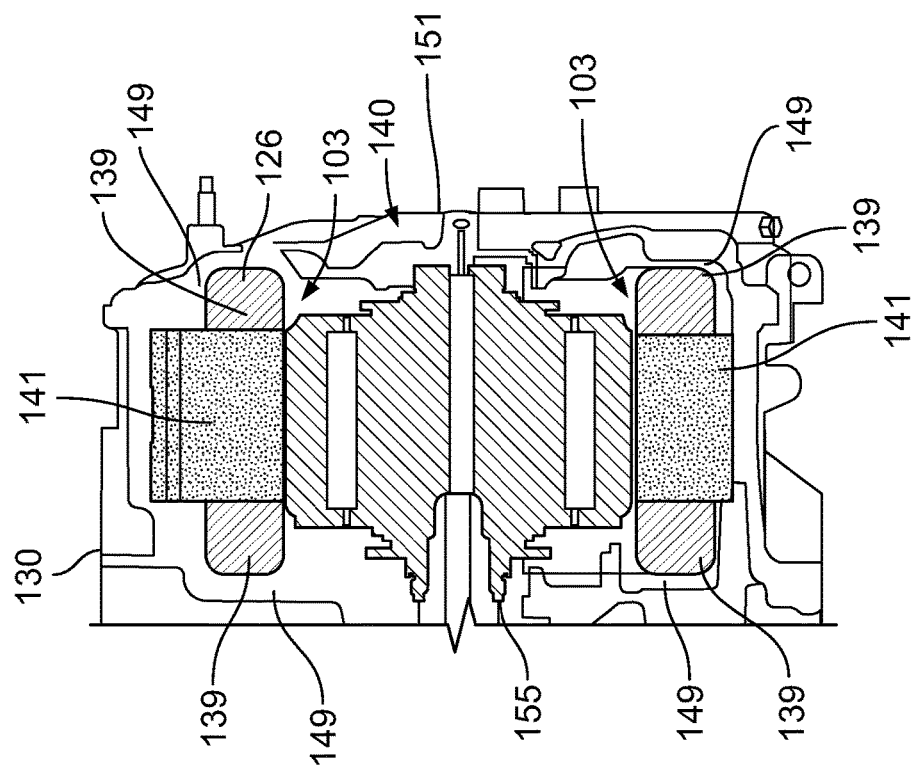
FIG. 3B is a side-view, in cross-section, of a portion of the electric machine assembly of FIG. 3A.
Figure 3A:
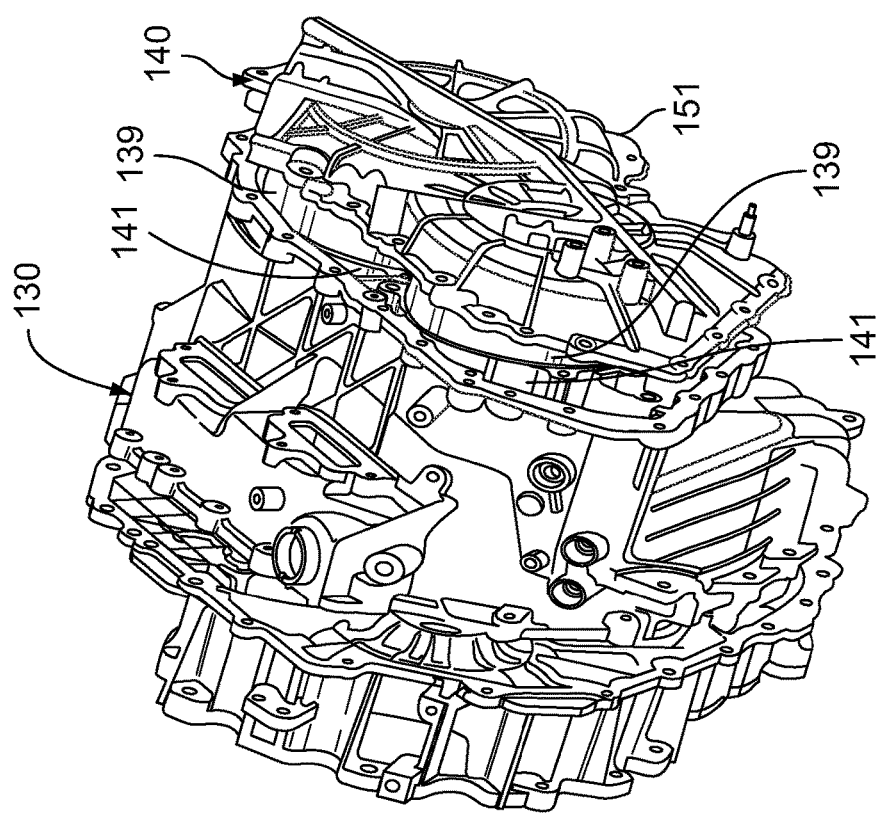
FIG. 3A is a perspective view of an electric machine assembly showing a housing with a cover partially exploded therefrom.

FIG. 3A shows an example of a housing to retain vehicle components, referred to as a housing 130 herein. Examples of vehicle components which may be retained within the housing 130 include an electric machine, such as the electric machine 100, or a vehicle transmission. A cover 140 may be secured to the housing 130. FIG. 3B shows a cross-sectional view of a portion of FIG. 3A. The cover 140 may be arranged with a stator core 141 such that a channel 149 is defined by the cover 140 to receive end windings 139 extending from the stator core 141. For example, the channel 149 defined by the cover 140 may be sized such that end windings 139 protruding from the stator core 141 may be disposed therein. A rotor 155 may be operably connected to the stator core 141.

Figure 4B:
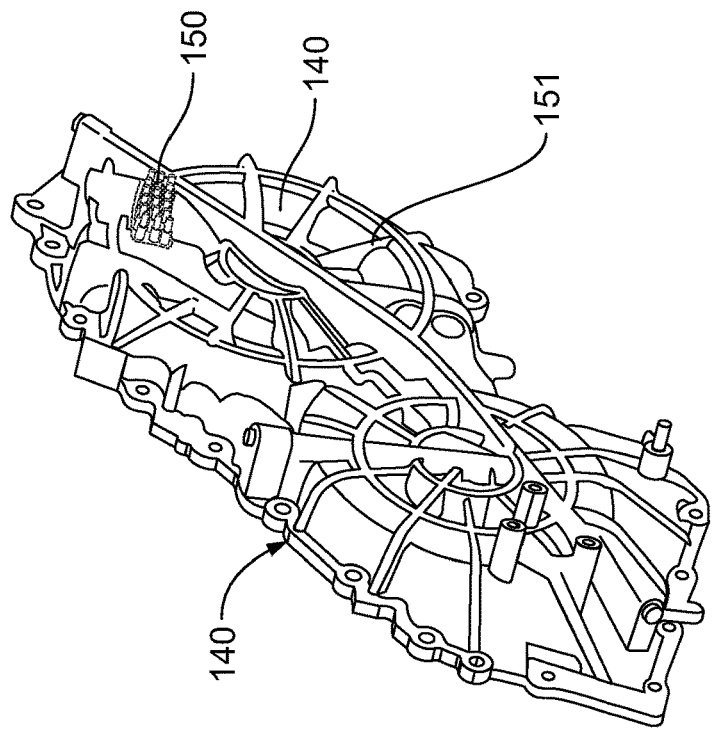
FIG. 4B is a second perspective view of the cover of FIG. 3A.
Figure 4A:
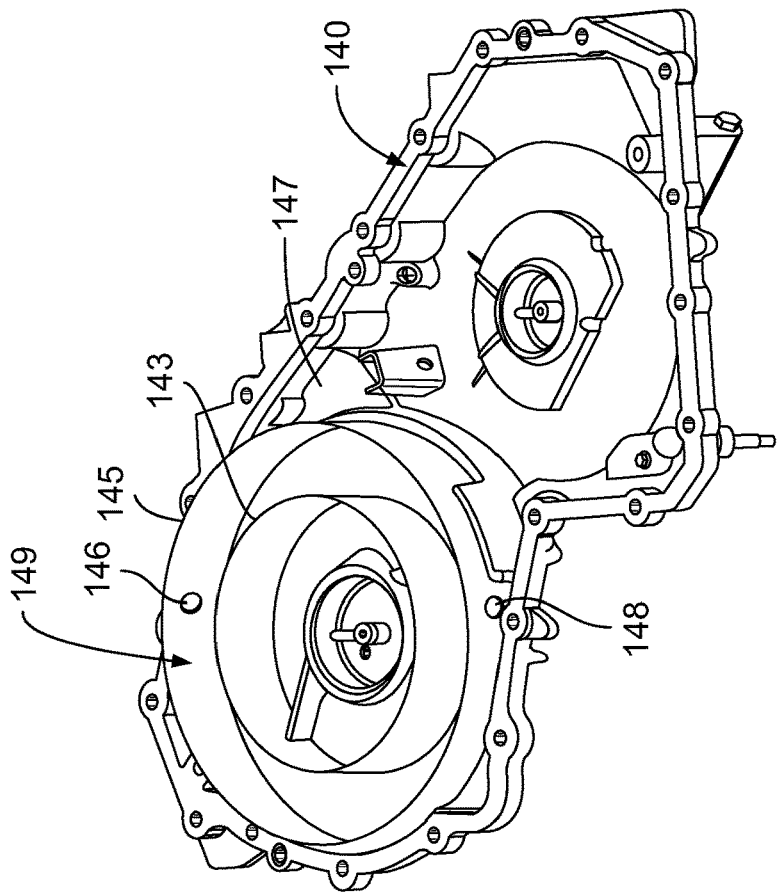
FIG. 4A is a first perspective view of the cover of FIG. 3A.

FIGS. 4A and 4B show two views of the cover 140. As mentioned, the cover 140 may define a coolant channel integrated therewith and oriented to align with the end windings 126. For example, the coolant channel may include an inner sidewall 143 and an outer sidewall 145 extending from an interior surface 147 of the cover 140. The inner sidewall 143 and the outer sidewall 145 may define the channel 149 therebetween and extend from an interior surface 147 of the cover 140. A surface or member between the inner sidewall 143 and the outer sidewall 145 may be referred to as a base sidewall. The channel 149 may be sized such that the end windings 139 are received therein when the cover 140 is mounted to the housing 130. The cover 140 and the stator core 141 may be arranged with one another to create a seal therebetween and such that coolant delivered to the channel 149 is contained therein. The inner sidewall 143 and the outer sidewall 145 may be arranged with one another to form a tire or hub shape such that the rotor 155 may extend through a cavity defined by the inner sidewall 143 without interference. In another example, the inner sidewall 143, base sidewall, and the outer sidewall 145 may assist in defining a coolant channel and be part of a separate component secured to the cover 140 or for securing to a stator core, such as the stator core 141.

The cover 140 may define an inlet 146 open to the channel 149 to deliver coolant thereto and such that the end windings 139 disposed within the cavity are contacted by coolant flowing therethrough. Various suitable locations may be available for the inlet 146. The cover 140 may define an outlet 148. Coolant may exit the channel 149 via the outlet 148. Various suitable locations may be available for the outlet 148. The cover 140 may define one or more features on an exterior surface 151 of the cover 140 to assist in managing thermal conditions of the end windings 139. For example, one or more fins 150 may be defined by the cover 140. The fins 150 may be located adjacent the inlet 146, the outlet 148, may be dispersed about a portion of the exterior surface of the cover 140 corresponding to the channel 149, or may be proximate the channel 149 to operate as a heat sink. Locating the fins 150 proximate a portion of the channel 149 in which coolant flows may assist in removing, for example, heat from the coolant which is taken from the end windings 139 during operation thereof. Features within the channel 149 may also assist in managing thermal conditions of the end windings 139. For example, features may be defined within the channel 149 to assist in promoting turbulence of coolant flowing therethrough. Promotion of turbulence of coolant may draw additional heat from the end windings 139 in comparison to a constant coolant flow.

Figure 5:
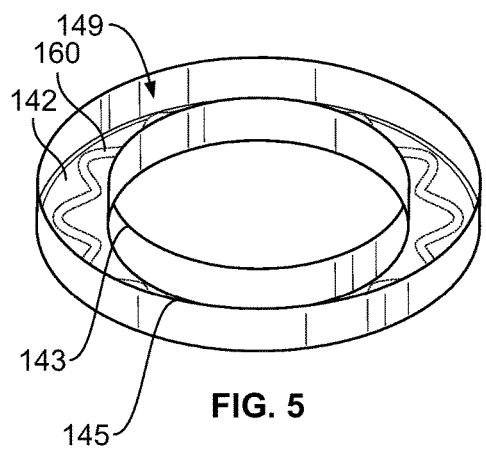
FIG. 5 is an example of a portion of a coolant channel defining a trough for coolant to flow therethrough.
Figure 6:
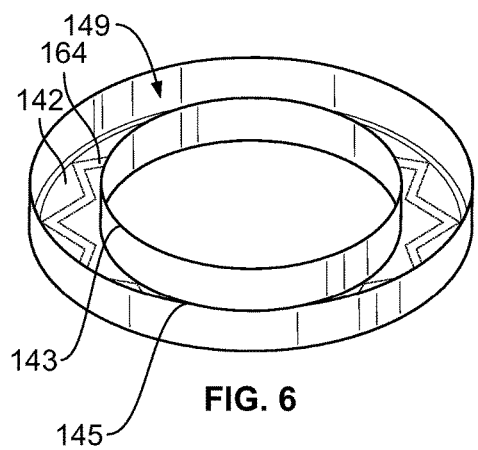
FIG. 6 is an example of a portion of a coolant channel defining a trough for coolant to flow therethrough.

FIGS. 5 through 9 show examples of features which may assist in promoting turbulence of coolant flowing through the channel 149 or may assist in providing a targeted flow of coolant within the channel 149. FIGS. 5 and 6 show examples in which the cover 140 defines a meandering trough to assist in distributing coolant to a desired area. For example, the meandering trough may correspond to a location of a portion or portions of the end windings 139 which generate more heat than other portions of the end windings 139 during operation. In one example, the meandering trough may be a recess defining a depth below the interior surface 147. In another example, the meandering trough may be defined by raised edges extending from the interior surface 147 of the cover 140.

In FIG. 5, a meandering trough 160 is formed in a curve pattern in a snake-style to direct a flow of coolant therethrough. In FIG. 6, a meandering trough 164 is formed in a zig-zag pattern to direct a flow coolant therethrough. A helical form is another example of a shape for the meandering trough. In one example, the patterns of the meandering troughs 160 and 164 may provide for an extended contact of coolant with the end windings 139 disposed within the channel 149. In this example, the meandering troughs 160 and 164 may direct a flow of coolant to predetermined and targeted areas of or around the end windings 139. While the meandering troughs 160 and 164 are shown on a first surface between the inner sidewall 143 and the outer sidewall 145, it is contemplated that the meandering troughs 160 and 164 may be located or defined on the sidewall surfaces. Optionally, the meandering troughs 160 and 164 may be defined by a separate component, such as an epoxy over mold. The over mold may be formed such that the end windings 139 extend therethrough and into the channel 149.

Figure 7:
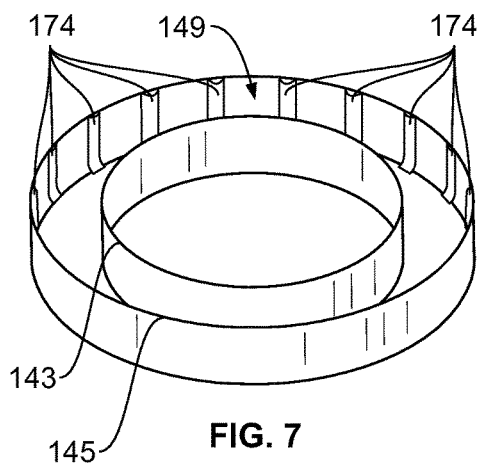
FIG. 7 is an example of a portion of a coolant channel defining an example of features on an interior surface to influence coolant flow.
Figure 8:
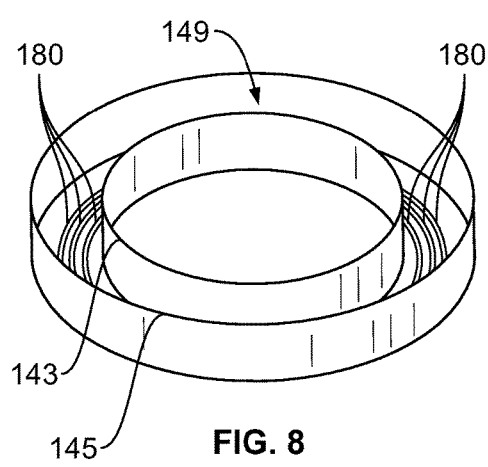
FIG. 8 is an example of a portion of a coolant channel defining an example of features on an interior surface to influence coolant flow.
Figure 9:
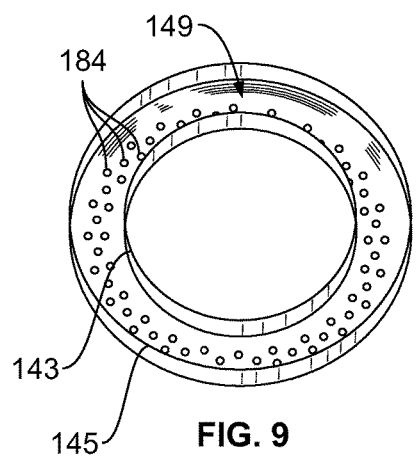
FIG. 9 is an example of a portion of a coolant channel defining an example of features on an interior surface to influence coolant flow.

FIGS. 7 through 9 show examples of features which may assist in promoting turbulence of coolant flowing through the channel 149. FIG. 7 shows post extrusions 174 defined by the outer sidewall 145. It is contemplated that the post extrusions 174 may be separate components secured to the outer sidewall 145. The post extrusions 174 may also be spaced apart from one another along the inner sidewall 143. Coolant flowing within the channel 149 may contact the post extrusions 174 to change or disrupt a flow of the coolant. FIG. 8 shows concentric circular extrusions 180 defined by the cover 140. It is contemplated that the concentric circular extrusions 180 may be separate components secured to the cover 140. The concentric circular extrusions 180 may be spaced apart from one another along the interior surface 147 of the cover 140. It is also contemplated that the concentric circular extrusions may be spaced apart from one another on the inner sidewall 143 or the outer sidewall 145. Coolant flowing within the channel 149 may contact the concentric circular extrusions 180 to change or disrupt a flow of the coolant. FIG. 9 shows individual extrusions 184 defined by the interior surface 147 of the cover 140 scattered about the channel 149. It is also contemplated that the individual extrusions may be separate components secured to the cover 140. The individual extrusions 184 may be spaced apart from one another along the interior surface 147 of the cover 140 or along the sidewalls. Coolant flowing within the channel 149 may contact the individual extrusions 184 to change or disrupt a flow of the coolant.

FIGS. 10A through 10E show an example of a portion of an electric machine, referred to generally as an electric machine 200 herein. The electric machine 200 may include a stator 202, end windings 204, an encasement 206, a rotor 208, and a plate 210. In this example, a relationship between the encasement 206 and the stator 202 may be described as a closed channel relationship in which the encasement 206 is arranged with the stator 202 and the plate 210 to provide a closed coolant channel for the end windings 204. An inlet 203 and an outlet 205 may be open to the closed coolant channel to deliver and remove coolant. The end windings 204 may extend through a cavity defined by the stator 202, though only a portion of the end windings 204 are shown for clarity. For example, the encasement 206 may be sized to receive end windings 204 extending therein. The rotor 208 may be sized for disposal within the cavity defined by the stator 202. The plate 210 may be disposed between the stator 202 and the encasement 206. The stator 202 and/or the encasement 206 may define a recess 211 to receive the plate 210 therebetween. The stator 202 may define one or more apertures 207 for alignment with an aperture 216 of the plate 210 to assist in securing the plate 210 to the stator 202. For example, a bolt or other fastener may secure the plate 210 to the stator 202 via the apertures 207 and 216.

A first fastener assembly 220 may assist in securing the encasement 206 to the plate 210. For example, the plate 210 may define a tab 226 and the encasement 206 may define a key 222. The tab 226 and the key 222 may be sized for engagement. For example, the tab 226 may define an aperture or receiving cavity to receive a portion of the key 222 such that the encasement may be secured to the plate 210. A second fastener assembly 227 may also assist in securing the encasement 206 to the plate 210. For example, the plate 210 may define a slot 228 sized to receive an extension 230 of the encasement 206. The slot 228 and the extension 230 may be arranged with one another, such as in an arrangement facilitating a snap engagement, to assist in aligning the tab 226 and key 222 for engagement. The slot 228 may also be located on the stator 202 such that the aperture 216 of the plate 210 aligns with the aperture 207 of the stator 202 when the extension 230 is disposed within the slot 228. Multiple fastener assemblies 220 and 227 may be used to further assist in securing the encasement to the plate 210. A sealant may be disposed between one of or both of the stator 202 and the plate 210 or the plate 210 and the encasement 206 to assist in sealing the closed coolant channel. It is contemplated that another encasement, similar to encasement 206, may be secured in a similar manner to the stator 202 opposite the encasement 206 to contain end windings 204 protruding out of the stator 202.

Figure 11B:
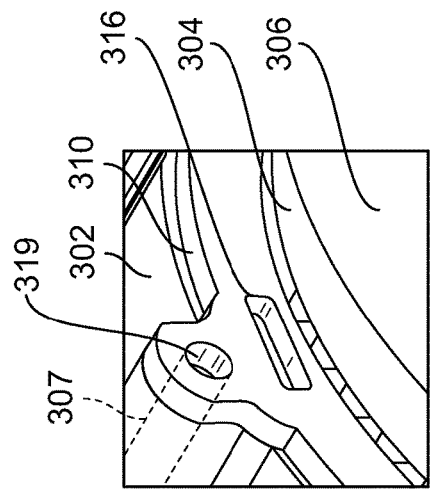
FIG. 11B is a perspective view of a fastener assembly of the portion of the electric machine of FIG. 11A.
Figure 11C:
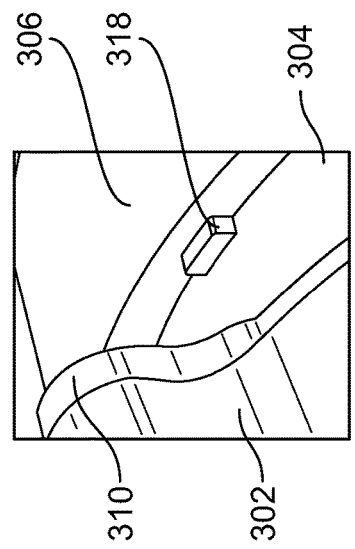
FIG. 11C is a perspective view of the fastener assembly of the portion of the electric machine of FIG. 11A.
Figure 11A:
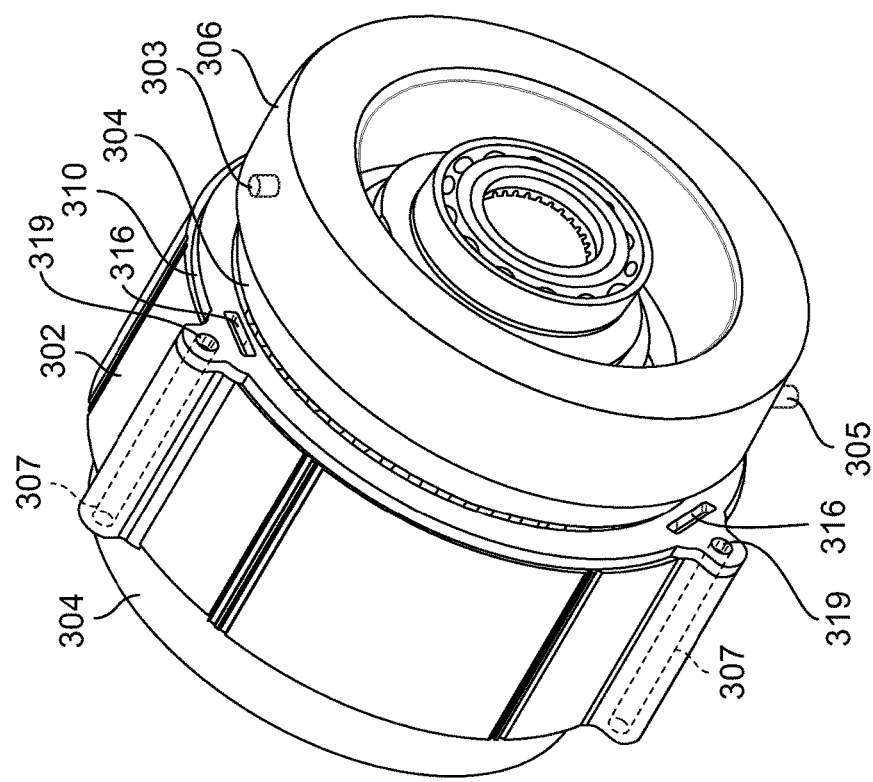
FIG. 11A is a perspective view of a portion of an electric machine.

FIGS. 11A through 11C show an example of a portion of an electric machine, referred to generally as an electric machine 300 herein. The electric machine 300 may include a stator 302, end windings 304, an encasement 306, a rotor 308, and a plate 310. In this example, a relationship between the encasement 306 and the stator 302 may be described as a closed channel relationship in which the encasement 306 is arranged with the stator 302 and the plate 310 to provide a closed coolant channel for the end windings 304. The end windings 304 may extend through a cavity defined by the stator. The encasement 306 may be sized to receive end windings 304 extending therein. An inlet 303 and an outlet 305 may be open to the closed coolant channel to deliver and remove coolant. The rotor 308 may be sized for disposal within the cavity defined by the stator 302. The plate 310 may be disposed between the stator 302 and the encasement 306. The stator 302 and/or the encasement 306 may define a recess to receive the plate 310 therebetween. The stator 302 may define one or more apertures 307 for alignment with an aperture 319 of the plate 310 to assist in securing the plate 310 to the stator 302. For example, a bolt or other fastener may secure the plate 310 to the stator 302 via the apertures 307 and 319.

The encasement 306 is shown separated from the plate 310 in FIGS. 11A through 11C to assist in showing a slot 316 defined by the plate 310 and a tab 318 defined by the encasement 306. The slot 316 may be sized to have a larger opening at one end relative to the other end. This size difference may assist in securing the encasement 306 to the plate 310. For example, the tab 318 may be inserted into the larger opening of the slot 316 and then the encasement 306 may be rotated such that the tab 318 slides into the other end of the slot 316. An arrangement of the slot 316 and the tab 318 may be such that the encasement 306 is secured to the plate 310 when the tab 318 is engaged with the side surfaces of the slot 316. It is contemplated that another encasement, similar to encasement 306, may be secured in a similar manner to the stator 302 opposite the encasement 306 to contain end windings 304 protruding out of the stator 302.

FIGS. 12 through 15 show an example of an operation to form an encasement for end windings of an electric machine. FIG. 12 shows a schematic of a portion of an electric machine which may include a stator 402, end windings 404, an encasement 406, an inlet 410, and an outlet 412. The encasement 406 may be formed via a mold process to create a closed coolant channel for the end windings 404. For example, a dissolvable base mold 420 may be applied to the end windings 404 as shown in FIG. 13. The base mold 420 may be made from, for example, wax, sugar, or salt. The base mold 420 may also be made of a thermally conductive material to assist in removing heat from the end windings 404. The end windings 404 may be immersed in a bath of the base mold 420 and then removed such that the base mold 420 may solidify. Multiple immersions may be executed to achieve a desired thickness of the base mold 420. Placeholders for the inlet 410 and outlet 412 may be inserted within base mold 420. While FIGS. 13 through 15 show a space between the base mold 420 and the stator 402, it is contemplated that the base mold 420 may be formed such that the base mold 420 contacts the stator 402. It is also contemplated that the base mold 420 may have an L-shape instead of surrounding the end windings 404 as shown in FIG. 13.

The base mold 420 and end windings 404 may then be immersed in a bath of epoxy and then removed such that an over mold 422 may be formed as shown in FIG. 14. Multiple immersions may be executed to achieve a desired thickness of the over mold 422. The base mold 420 may then be removed to create a cavity. For example, removing the base mold 420 provides a cavity 430 defined between the end windings 404 and the over mold 422. A liquid may be applied to the base mold 420 via the inlet 410 to dissolve the over mold 422. The liquid may have characteristics which react with the desired material of the over mold 422 to dissolve the same. In another example, the base mold 420 may be made of wax. In this example, heat may be applied proximate the wax to melt the same to define the cavity 430. As such, the encasement 406 may be formed to define a closed coolant channel about the end windings 404 for coolant to flow through and assist in managing thermal conditions of the end windings 404.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An electric machine housing cover comprising:
an inner sidewall; and
an outer sidewall spaced from the inner sidewall to define a coolant channel therebetween,
wherein the sidewalls are defined by an interior cover surface, wherein the coolant channel receives stator end windings when the cover is secured to the housing, and wherein the interior cover surface defines a meandering trough between the sidewalls to form a predetermined coolant path relative to end winding locations.

2. The cover of claim 1, wherein the interior cover surface defines features between the sidewalls to promote turbulence of coolant flowing through the coolant channel, and wherein the features are one of a plurality of individual extrusions scattered about the coolant channel, concentric circular extrusions about a hub of the coolant channel, or post extrusions spaced apart from one another along the inner sidewall or outer sidewall.

3. The cover of claim 1, wherein the cover defines an inlet and an outlet open to the coolant channel.

4. The cover of claim 1 further comprising a stator, wherein the stator and the outer sidewall are sized such that the coolant channel is sealed when the cover is secured to the electric machine housing.

5. The cover of claim 1, wherein the cover further defines one or more fins on an exterior surface proximate the coolant channel to operate as a heat sink.

6. A housing of an electrified vehicle electric machine comprising:
a cover defining an interior surface and an exterior surface;
an inner sidewall defined by the interior surface and having a circular shape; and
an outer sidewall defined by the interior surface and spaced apart from the inner sidewall to define a coolant channel therebetween,
wherein the interior surface is arranged with the housing such that the coolant channel receives end windings of a stator of the electric machine when the cover is secured to the housing, and wherein the outer sidewall is spaced from an edge of the cover such that a rotor of the electric machine at least partially extends in between the sidewalls.

7. The housing of claim 6, wherein the interior surface further defines a meandering trough between the inner sidewall and outer sidewall for coolant to flow therethrough.

8. The housing of claim 6, wherein the outer sidewall further defines an inlet and an outlet open to the coolant channel.

9. The housing of claim 6, wherein the inner sidewall defines a cavity sized for a rotor of the electric machine to at least partially extend therethrough.

10. The housing of claim 6 further comprising a sealant disposed between the sidewalls and the stator.

11. The housing of claim 6, wherein the stator further defines a bracket extending from a face of the stator sized to receive a key defined by the outer sidewall to secure the outer sidewall to the stator.

12. The housing of claim 6, wherein the stator defines a slot sized to receive a tab defined by the outer sidewall to secure the outer sidewall to the stator.

13. The housing of claim 6 further comprising an O-ring plate sized for disposal between the sidewalls and the stator.

14. The housing of claim 6, further comprising one or more fins extending from an exterior cover surface and located proximate the coolant channel.

15. The housing of claim 14, wherein the one or more fins are adjacent one of an inlet or outlet defined by the outer sidewall.

16. A method to form an encasement about end windings of an electric machine comprising:
- immersing the end windings in a mold material bath and then removing the end windings for the mold material to solidify and define a base mold upon the end windings;
- positioning inlet and outlet placeholders extending in and out of the base mold;
- immersing the base mold in an epoxy bath and then removing the base mold for the epoxy to solidify and define an over mold; and
- dissolving the base mold via a liquid applied to the base mold such that a cavity is defined between the end windings and the over mold.

* * * * *